Figure 1:
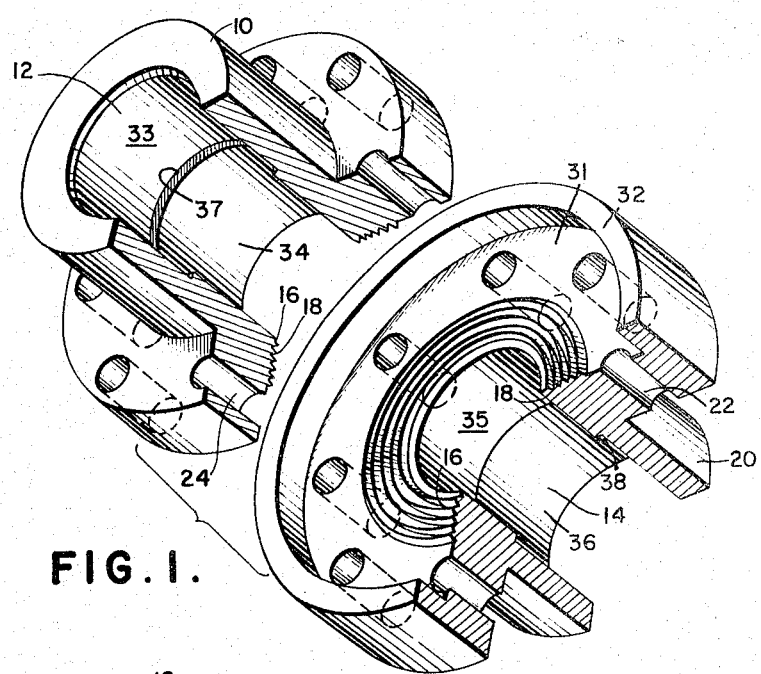

Jan. 31, 1967   P. K. PLATT ETAL   3,301,578
CRYOGENIC CONNECTOR FOR VACUUM USE
Filed Nov. 17, 1964

INVENTORS
William T. Kitts &
Philemon K. Platt

BY

ATTORNEY

United States Patent Office 3,301,578
Patented Jan. 31, 1967

3,301,578
CRYOGENIC CONNECTOR FOR VACUUM USE
Philemon K. Platt, Annapolis, Md., and William T. Kitts, Houston, Tex., assignors to the United States of America as represented by the Administrator of the National Aeronautics and Space Administration
Filed Nov. 17, 1964, Ser. No. 411,944
1 Claim. (Cl. 285—331)

The invention described herein may be manufactured and used by or for the Government of the United States of America for governmental purposes without the payment of any royalties thereon.

This invention relates to a seal for use in a very high vacuum environment and more particularly to a metal-to-metal leak-tight seal for use in a very high vacuum system which also operates at cryogenic or very low temperatures.

There has been a marked increase in the demand for very high vacuum chambers, $10^{-6}$ to $10^{-9}$ torr (mm. Hg abs.), such as in the area of space vacuum simulation and for the surface study of materials. Seals are required for use in such chambers, for example to join various components together by flanges for pumping purposes. Various schemes have been used heretofore to form very high vacuum seals. These include the use of elastomer gaskets, metallic gaskets, glass-to-metal and glass-to-ceramic joints. Glass-to-metal and glass-to-ceramic seals have found their major use in electrical feedthrough and sight glasses. Elastomer seals, while widely used with flange designs, have a major drawback in their outgassing rate.

Flanges using a soft deformable metal gasket such as copper, aluminum, gold and nickel are presently being used in a variety of combinations. However, these prior art metallic seal combinations are not suitable for use in very high vacuum chambers, as they are susceptible to damage, are costly to construct, require extremely accurate alignment and leak upon almost imperceptible scratches on the surface of the gasket. Soldering or welding has also been used in attempts to form an efficient seal; however, such a process introduces contamination into the vacuum chamber, is not easily constructed and is not readily adapted for disassembly.

The various attempts to form a seal between two metal components, such as flanges in a piping mechanism, by the use of a soft metallic gasket have included what is known in the art as the stepped, knife edge and coined gasket seals. These, as well as modifications thereof are summarized in a handbook written by H. A. Steinherz entitled, "Handbook of High Vacuum Engineering," starting at page 149; however, a suitable metallic gasket seal which will be capable of providing a relatively leak proof (less than $1 \times 10^{-5}$ std. atmos. cc./sec.) junction when operation in a very high or ultra high vacuum environment has not been fully realized. The use of elastomer and metallic seals for ultra high vacuum system is discussed in U.S. Patent No. 3,144,035.

Further, a metal-to-metal seal which is to be used in a space simulation chamber must be capable of withstanding thermal-shocking within the temperature range from 0° absolute to over 300° Fahrenheit. Thus, it is necessary that the seal be relatively leak proof not only at vacuum conditions ($10^{-8}$ torr) but also at cryogenic temperatures (−320° F. and below).

Therefore, it is an object of this invention to provide an improved sealing device for use at cryogenic temperatures in a very high vacuum environment.

It is a further object to provide an improved seal which uses at least two sets of serrations positioned so as to form two sealing surfaces for each serration, the seal being leak-tight although operating in a very high vacuum environment and though being subject to extreme thermal shock.

The above objects are achieved by the use of a circular soft metal gasket which is clamped between two circular connecting members or portions of a flange. Each member includes a series of ridges and grooves which are positioned to mate so as to deform the metal gasket between them. By this arrangement, each ridge on one member when mated with a corresponding groove on the other member effectively forms two sealing surfaces at each ridge-groove combination.

Figure 2:
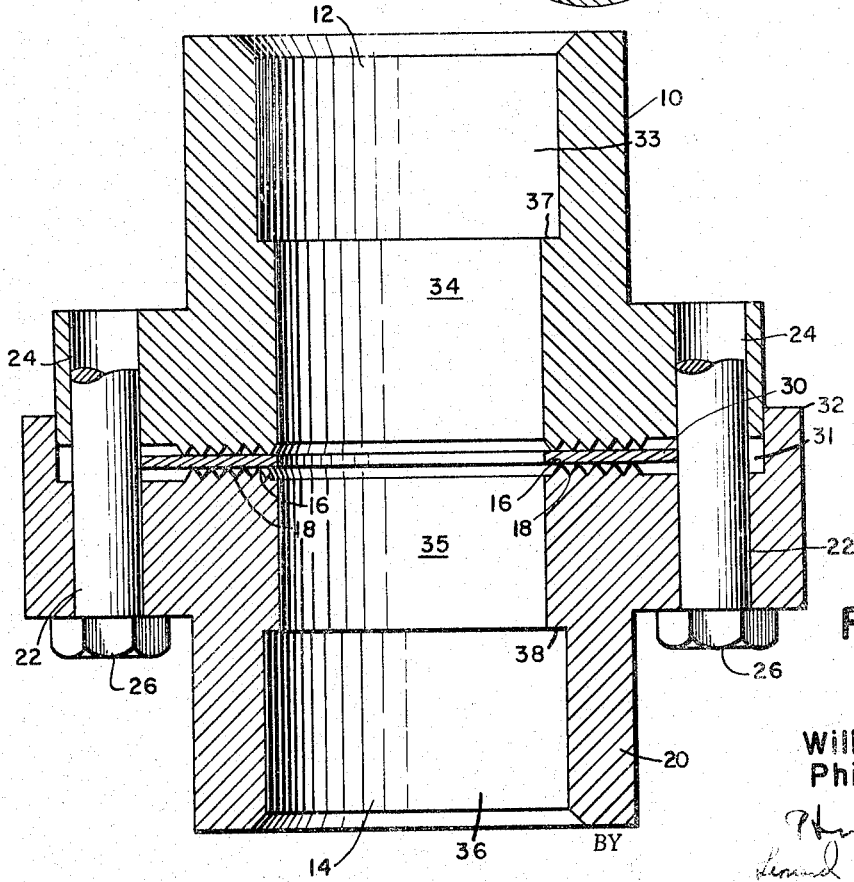

The above objects as well as the advantages and features of the present invention will, of course, become apparent and immediately suggest themselves to those skilled in the art to which the invention is directed from the reading of the following detailed description in connection with the accompanying drawings in which:

FIGURE 1 is a perspective view of the cryogenic connector of this invention; and FIGURE 2 is a partial side view of the sealing device of this invention.

Referring now and in more detail to FIGURE 1, a cryogenic connector for connecting to portions of a cryogenic fluid system is illustrated. Thus, flange members 10 and 20 are to be connected so that, when joined, a suitable cryogenic liquid such as liquid nitrogen, may be pumped through openings 12 and 14. It is noted that each member 10 and 20 contains a series of circular ridges 16 and grooves 18, which are positioned so as to mate when members 10 and 20 are joined. This joining or mating of the respective ridges and grooves will be shown more clearly in relation to FIGURE 2 infra. As may be seen in FIGURE 1, each ridge possesses a sharp edge since the angle for forming the respective grooves is 60°. It is noted that each flange member 10 and 20 contains a plurality of bores 22 and 24. The bores 22 on the lower member 20 are formed so as to coincide with corresponding bores 24 on the upper member 10.

FIGURE 2 shows a partial side view of the flange and sealing gasket arrangement which provides the leak-tight seal. Member 10 is positioned with respect to member 20 so that a ridge 16 on member 10 will fit into a groove 18 on member 20. It is evident that a ridge on member 20 also will mate with a groove on member 10. A sealing member gasket 30, which also is circular in the preferred embodiment, and which is made of a yieldable material such as copper, is positioned so as to receive the ridges of both members 10 and 20. Other soft metals such as gold, aluminum and silver may be used. Also shown in FIGURE 2 is a plurality of bolts 26 which are to be fit into bores 22 and 24. The bolts 26, which preferably are stainless steel, together with corresponding bores 22 and 24, form a conventional bolt arrangement by which uniform pressure may be applied to the flange in drawing members 10 and 20 together.

Flange member 20 contains an annular recess 31 defined by a protruding continuous lip portion 32 formed on periphery of the flange member. Lip portion 32 acts as a guide for the insertion of flange member 10 into the recess 32 of flange member 20, and, in addition, upon the two flange members being drawn together by the tightening of bolts 26, it results in there being a snug fit between the two flange members and there being proper mating of the respective ridges and grooves.

It is also to be noted from FIGURE 2 that opening 12 of flange member 10, includes a first cylindrical section 33 and a second cylindrical section 34 and that opening 14 of flange member 20 includes a first cylindrical section 35 and a second cylindrical section 36. Cylindrical sections 33 and 36 are chosen to have substantially the same diameter and to be greater in diameter than cylindrical sections 34 and 35. These latter two cylindrical sections are chosen to be of substantially the same diameter. With the cylindrical sections being dimensioned, as just described, shoulders 37 and 38 are formed at the junction of cylindrical sections 33, 34 and 35, 36, respectively. These shoulders determine the depth of insertion of a pipe into section 33 and/or section 36, as the case may be, and, in addition provide for a condition of substantially turbulent free fluid flow between the pipes and the flanges since they permit the inner surfaces of sections 34 and 35 to make a substantially continuous connection with the inner surface of the pipes.

In operation, a uniform sealing pressure is applied by tightening the series of bolts 26 within bores 22 and 24. (In FIGURE 2, the sealing member 30 is not shown as completely deformed.) As uniform pressure is applied the various ridges 16 deform sealing member 30 to form an effective leak-tight seal. It is noted that when sealing member 30 is so deformed each combination of a ridge on one member, and a groove on the other member effectively forms two sealing surfaces between the members 10 and 20. Thus, when a ridge 16 on member 20 is forced into groove 18 in member 10, the sealing member 30 is so deformed that each sloping portion of ridge 16 is sealed from each sloping portion of groove 18. As previously stated, the angle of slope approximates 60° in a specific embodiment.

Typically in a preferred embodiment of this invention, member 10 consists of a stainless steel flange which includes six concentric ridges and five concentric grooves. Member 20 is also stainless steel and contains five concentric ridges and six concentric grooves. Also the sharp edges of the ridges are broken at approximately a .005 inch radius. Thus, effectively ten sealing surfaces may be formed between members 10 and 20 and this insures the necessary low leak rate (less than $1 \times 10^{-5}$ std. atmos. cc./sec.) at $10^{-8}$ torr at $-320°$ F. Conventional stepped and knife-edge seals are not capable of such performance at such conditions.

The advantages of this seal are numerous since it is inexpensive and provides for efficient and easy installation and removal. Also soldering is eliminated although the seal still provides a strong junction capable of withstanding thermal shocks at vacuum pressures.

It is to be understood that the foregoing disclosure relates to a preferred embodiment of the invention, and numerous modications can be made, such as the use of the disclosed seal for the vacuum chamber door seal or for the vacuum line coupling or the like, without departing from spirit or scope of the invention as defined in the appended claim.

What is claimed is:

A metal-to-metal cryogenic vacuum seal coupling for use in sealing vacuum chambers at pressures below $10^{-6}$ millimeter of mercury absolute and temperatures below $-320$ degrees Fahrenheit, comprising:

a first circular flange member of stainless steel having an opening therethrough to permit the passage of fluid, said opening including a first cylindrical section and a second cylindrical section, said first cylindrical section having a diameter greater than said second cylindrical section to form a shoulder at the junction of the two sections, said shoulder serving to limit the insertion of a pipe into said first section of said opening of said first flange member and to permit the inner surface of the pipe to mate with the inner surface of said second section such that there would be a substantially turbulent free flow of fluid from the pipe through said first flange;

said first flange member having thereon six concentric ridges and five concentric grooves starting closely adjacent the walls forming said second cylindrical section of said opening of said first flange member and continuing radially outwardly, said grooves alternating with said ridges and forming angles of 60° therewith, said ridges being conical in cross section;

a second circular flange member of stainless steel having an opening therethrough to permit the passage of fluid, said opening including a first cylindrical section and a second cylindrical section, said second cylindrical section having a diameter greater than said first cylindrical section to form a shoulder at the junction of the two sections, said shoulder serving to limit the insertion of a pipe into said second section of said opening of said second flange member and to permit the inner surface of the pipe to mate with the inner surface of said first section such that there would be a substantially turbulant free flow of fluid from said second flange through said pipe attached thereto;

said second circular flange member having thereon five concentric ridges and six concentric grooves starting closely adjacent the walls forming said first cylindrical section of said opening of said second flange member and continuing radially outwardly, said grooves alternating with said ridges and forming angles of 60° therewith, said ridges being conical in cross section;

said ridges and grooves of the first and second flange members being positioned such that the ridges of said first flange member will mate with the grooves on said second flange member and the ridges on said second flange member will mate with the grooves on said first flange member;

said second flange member having an annular recess defined by protruding peripherally continuous lip portion extending axially, whereby said first flange member snugly fits in said recess, and, upon being inserted in said recess, has its outer surface both guided and held rigidly in position by said protruding lip portion to insure proper mating of said grooves and ridges of the first and second flange members and concentric alignment of said openings;

a plurality of bolt means located radially inwardly of said protruding lip portion and radially outwardly of said grooves and ridges for interconnecting said first and second flange members;

and an annular copper sealing gasket radially coextensive with said ridges and grooves and positioned between the first and second flange members such that, when the first and second flange members are drawn together and pressure is applied by said plurality of bolt means said sealing gasket is deformed between said ridges and grooves to thereby create ten sealing surfaces between the first and second flange member and at the same time provide a mating between the inner surfaces of said openings such that fluid flow between said first and second flange members is substantially turbulant free.

References Cited by the Examiner

UNITED STATES PATENTS

| 1,715,854 | 6/1929 | McKenzie | 285—331 |
| 1,847,218 | 3/1932 | Lamb | 285—363 X |
| 1,906,826 | 5/1933 | Smith | 285—354 X |
| 3,211,478 | 10/1965 | Batzer | 285—363 X |

FOREIGN PATENTS 716,079 1/1942 Germany.

CARL W. TOMLIN, *Primary Examiner.*